United States Patent [19]

Geist et al.

[11] Patent Number: 4,557,976
[45] Date of Patent: Dec. 10, 1985

[54] HEAT-HARDENABLE BINDER MIXTURE

[75] Inventors: Michael Geist, Münster; Horst Diefenbach, Nottuln, both of Fed. Rep. of Germany

[73] Assignee: BASF Farben & Fasern AG, Hamburg, Fed. Rep. of Germany

[21] Appl. No.: 526,072

[22] Filed: Aug. 24, 1983

[30] Foreign Application Priority Data

Sep. 7, 1982 [DE] Fed. Rep. of Germany ....... 3233139
Jun. 24, 1983 [DE] Fed. Rep. of Germany ....... 3322766

[51] Int. Cl.$^4$ .................. B05D 3/02; B32B 15/08; B32B 27/38; C08L 63/00
[52] U.S. Cl. .................. 428/413; 204/181.7; 427/27; 427/386; 427/388.2; 428/418; 428/423.1; 428/425.8; 525/107; 525/208; 525/438
[58] Field of Search ............ 427/386, 388.2, 27; 525/107, 208, 438; 204/181 C; 428/413, 418, 423.1, 425.8

[56] References Cited

U.S. PATENT DOCUMENTS

| | | |
|---|---|---|
| 3,976,717 | 8/1976 | Labana et al. ............ 525/208 X |
| 4,006,200 | 2/1977 | Labana et al. ............ 525/208 |
| 4,091,049 | 5/1978 | Labana et al. ............ 525/208 X |
| 4,223,097 | 9/1980 | Johannes et al. .......... 525/107 |
| 4,371,667 | 2/1983 | Moller et al. ............ 525/208 |
| 4,373,059 | 2/1983 | Patzchke et al. ......... 525/107 X |
| 4,383,059 | 5/1983 | Brook et al. ............ 525/107 X |
| 4,447,580 | 5/1984 | Ai et al. ................ 525/208 X |

Primary Examiner—Michael R. Lusignan
Attorney, Agent, or Firm—Wells & Wells

[57] ABSTRACT

The invention relates to a heat-hardenable binder mixture which comprises (A) an organic nonacidic resin having a hydroxyl group content of at least 0.2 equivalent in 100 g of resin and having a molecular weight of at least 850, and (B) a crosslinking agent based on an organic compound which contains at least 2 carbalkoxymethyl ester groups per molecule.

35 Claims, No Drawings

HEAT-HARDENABLE BINDER MIXTURE

BACKGROUND OF THE INVENTION

The invention relates to a heat-hardenable binder mixture based on a hydroxyl-containing organic resin.

Many and varied chemical reactions have been proposed, and in fact used, for hardening paints by crosslinking the binders in paint films. The chemical bonds formed in the course of the crosslinking reaction frequently do not meet all the demands made on paint films.

In 2-component systems, it is frequently necessary to block one of the reactive groups to suppress premature reaction. The compounds then released in the course of baking pollute the environment, in particular in the case of amines or phenols.

Electrocoating has become widely established in recent years for priming electrically conductive substrates. Anodic electropriming has so far been to the fore. The resin binders used for this purpose belong to the class of carboxyl-containing resins, for example to the classes of maleinate oils, maleinated epoxy resins, alkyd resins, acrylic resins and in particular maleinated polybutadienes. These resins were made water-soluble by salt formation, chiefly with amines, and deposited in the electrocoating bath by the current at the anode. The anodic electropriming process, however, has serious disadvantages. For instance, oxygen evolves in the course of the electrodeposition at the anode and can have a drastic, adverse effect on the resins depositing at the anode. Furthermore, metal ions go into solution at the anode and end up in the baked film as imperfections. The metal ions can bring about discoloration and spots. They are the cause of qualitative disadvantages, in particular through salt formation and hence through reduction in water resistance and corrosion protection.

Cathodic electropriming, which has been developed in recent years to the stage of commercial feasibility, is increasingly replacing the anodic method, since the deficiencies described above are largely avoided. For instance, the cathode, where the paint film is now deposited, evolves, in the course of the deposition process, hydrogen, which does not affect the resin binder. Since cathodic deposition can take place within the approximately neutral pH range, hardly any metal ions go into solution. The binders suitable for cathodic deposition predominantly contain amino groups which are neutralized with acids to make the resins water-soluble.

European Pat. No. 12,463 B 1 discloses binders which crosslink with hydroxyl-containing resinlike compounds via the transesterification of crosslinking agents containing $\beta$-hydroxyalkyl ester groups. This transesterification, however, requires large amounts of heavy metal salts as hardening catalysts.

SUMMARY OF THE INVENTION

It is the object of the present invention to avoid this state of the art disadvantage and to provide such a binder mixture for preparing coating agents as consists of components with increased reactivity. The binder mixture of the invention should cut down on the environmental pollution resulting from the application of the corresponding coating agents. The coating agents which are based on the binder mixture of the present invention should, furthermore, be suitable for any type of application process, ie. it should be possible to use the binder mixture for baking finishes to be applied conventionally, for powder finishes and for aqueous powder slurries. The incorporation of solubilizing groups should make the binder mixture suitable for the electrocoating process.

This object is achieved in a novel manner when a binder mixture of the type mentioned in the introduction comprises the components (A) an organic nonacidic resin having a hydroxyl group content of at least 0.2 equivalent in 100 g of resin and having a molecular weight of at least 850, and (B) a crosslinking agent based on an organic compound which contains at least 2 carbalkoxymethyl ester groups per molecule.

The binder mixture, in addition to the components A and B, advantageously contains—as component C—pigments, fillers, crosslinking catalysts, corrosion inhibitors and further paint assistants.

Advantageously, the proportion of component A is 50-95% by weight and that of component B is 5-50% by weight, the total amount of components A and B being 100%.

DESCRIPTION OF THE PREFERRED EMBODIMENTS

In the course of baking, then, the carbalkoxymethyl ester groups of component B react with the hydroxyl group of component A to form an ester bond. The crosslinking mechanism is described in principle by the following reaction equation:

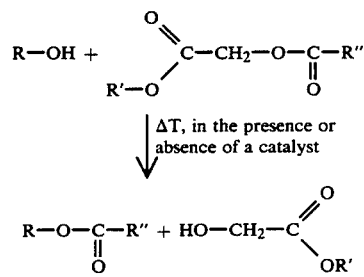

The eliminated hydroxyacetates preferably have such a boiling point as will advantageously enable them to act as flow-control agents in the course of baking.

The ester bond which forms in the course of baking has a very favorable effect on the adhesion of the film, in particular to metal substrates, and it also increases the resilience of the film. This crosslinking mechanism has the effect of making the paint film very resistant to solvents, alkalis and salt mists. The films form very resistant coatings, even without corrosion inhibitors, even on unpretreated iron sheet.

Component A of the binder mixture advantageously has a number average molecular weight of 850 to 20,000, preferably 1,000 to 10,000. In particular, if the binder mixture is used for electrocoating, component A, in addition to the hydroxyl groups, contains primary and/or secondary amino groups. If appropriate, tertiary amino groups or quaternary ammonium groups can also be present additionally.

The presence of primary or secondary amino groups in component A, in addition to the hydroxyl groups, is not however only of importance from the point of view of solubilizing the resins in aqueous electrocoating baths. The primary and secondary amino groups also contribute to the cross-linking by reacting, in the course of baking, with the carbalkoxymethyl ester groups of component B to form amide compounds. As a result the crosslinking is very effective, and the resulting coatings provide excellent corrosion protection. In addition, the shelf-life and the stability of electrocoating baths prepared with these binders are improved. Binder mixtures whose component A, in addition to the hydroxyl groups, contains at the same time primary and/or secondary amino groups are thus a particularly advantageous embodiment of the invention.

The primary and/or secondary amino groups are preferably introduced into the organic resin for preparing component A by reacting a polyamine and/or an amino and/or hydroxyl-containing ketimine with resins which contain at least one, preferably two, epoxide groups or isocyanate groups per molecule.

However, component A can also be obtained by other addition reactions, for example by esterifying or amidating compounds bearing primary and/or secondary amino groups by means of resins containing groups suitable for this purpose.

Resins which are particularly suitable for preparing component A contain epoxide groups, preferably terminal epoxide groups, and belong to the group consisting of polyglycidyl ethers, polyglycidyl esters and polyglycidylamines.

Other resins which contain epoxide groups and are advantageously suitable are copolymers of glycidyl acrylate and/or methacrylate or of any other olefinically unsaturated, polymerizable compound bearing a glycidyl group with alkyl and/or hydroxyalkyl esters of acrylic and/or methacrylic acid, and/or vinyl compounds, such as styrene, vinyltoluene or vinylcarbazole.

A further, particularly suitable group of resins are partially epoxidized polybutadiene oils.

For the purposes of this invention, polyglycidyl ethers are preferably those polyglycidyl ethers of the general formula

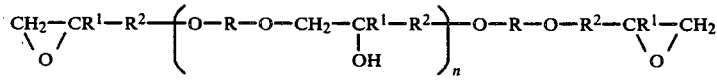

where

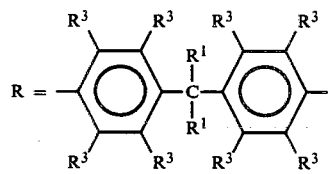

$R^1$ = H or $C_nH_{2n+1}$, $R^2$ = $(CR^1{}_2)_n$, $R^3$ = $R^1$, halogen and, preferably, H, n = 0 to 5.

The polyglycidyl ethers of the general formula shown have a number average molecular weight of about 340 to 5,000 and, accordingly, an epoxide equivalent weight of 170 to 2,500. The epoxy resins can also be used in the hydrogenated or partially hydrogenated state. To control the properties of the film, some of the reactive groups of the epoxy resin can be reacted with other compounds. There are several possible compounds for this purpose, including:

(a) carboxyl-containing compounds, such as saturated or unsaturated monocarboxylic acids (for example benzoic acid, linoleic acid, 2-ethylhexanoic acid or Versatic acid), aliphatic, cycloaliphatic and/or aromatic dicarboxylic acids of different chain lengths (for example adipic acid, sebacic acid, isophthalic acid or dimeric fatty acids), hydroxyalkylcarboxylic acids (for example lactic acid or dimethylolpropionic acid) and carboxyl-containing polyesters or (b) amino-containing compounds, such as diethylamine or ethylhexylamine or diamines having secondary amino groups, such as, for example, N,N'-dialkylalkylenediamine, such as dimethylethylenediamine, N,N-dialkylpolyoxyalkyleneamine, such as N,N'-dimethylpolyoxypropylenediamine, polyaminoamides, such as Versamide, with two moles of monoglycidyl ether or monoglycidyl ester, especially glycidyl esters of α-branched fatty acids, such as Versatic acid, or (c) hydroxyl-containing compounds, such as neopentylglycol, bisethoxylated neopentylglycol, neopentylglycol hydroxypivalate, hexane-1,6-diol, hexane-2,5-diol, 1,4-bis-(hydroxymethyl)-cyclohexane, 1,1-isopropylidene-bis-(p-phenoxy)-2-propanol, trimethylolpropane, pentaerythritol or amino alcohols, such as tri-ethanolamine, methyldiethanolamine or hydroxyl-containing alkylketimines, such as aminomethylpropane-1,3-diol methyl isobutyl ketimine and also polyglycol ethers, polyesterpolyols, polyetherpolyols or polycaprolactone-polyols of various degrees of functionality and of various molecular weights.

It is also possible to replace the polyglycidyl ethers which are based on bisphenol A by polyglycidyl ethers which are based on other fundamental components, such as triglycidyl isocyanurate, heterocyclic diglycidyl compounds or diglycidylhydantoins.

Suitable for use as polyglycidyl esters are reaction products of, for example, bisglycidyl terephthalate or bisglycidyl isophthalate with, for example, bisphenol A. The epoxide equivalent weight of these products is between 200 and 2,500. To control the properties of the film, some of the reactive glycidyl groups remaining can be reacted with other compounds. Compounds suitable for this purpose include those mentioned above under a, b and c.

For the purposes of the invention, polyglycidylamines are those glycidyl-containing resins which are obtained by introducing glycidyl groups into NH$_2$-functional resins, for example via epichlorohydrin.

Other particularly suitable compounds are copolymers of glycidyl acrylate and/or methacrylate or of any other olefinically unsaturated, polymerizable compound bearing a glycidyl group, with esters of acrylic and/or methacrylic acid and polymerizable vinyl compounds which have a number average molecular weight of 700 to 10,000 and an epoxide equivalent weight of 600 to 3,000. The acrylates are preferably with $C_2$- to $C_8$-alcohols, and the methacrylates are preferably with $C_1$- to $C_4$-alcohols. The copolymers can contain further monomers, such as hydroxyalkyl (meth)acrylate or (meth)acrylamide. The copolymer is prepared in a well-known manner by solution, suspension or emulsion polymerization in the presence of free-radical initiators, such as peroxides, hydroperoxides, peresters or thermolabile azo compounds, and, if appropriate, molecular weight regulators.

Partially epoxidized polybutadiene oils are, for the purposes of the invention, reaction products which are obtained by reacting commercially available polybutadiene oils with peracids or organic acid/$H_2O_2$ mixtures. The method of preparation has been described, for example, in Chemiker-Zeitung 95, 857 et seq. (1971).

To prepare water-dispersible binders, the resins which contain epoxide groups are reacted with polyamines and/or an amino- and/or hydroxyl-containing ketimine. If the addition reaction is carried out with the compounds bearing primary and secondary amino groups in the form of their ketimines, the reaction conditions should be controlled in such a way as to leave no ketimine-decomposing substances in the reaction product. The preferred ketimines are reaction products of ketones and such alkylamines or alkyldiamines as contain hydroxyl or secondary amino groups and have the general structure of R—NH—R—$NH_2$ or HO—R—$NH_2$ respectively. The ketimines have, for example, the following structure:

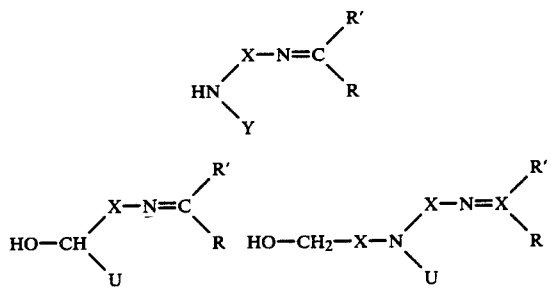

where:
$X = -(CR_2)_n-$
$R = -H, -R'$
$R' = -C_mH_{2m+1}, -C_6H_{11}$
$U = -R, -Y$

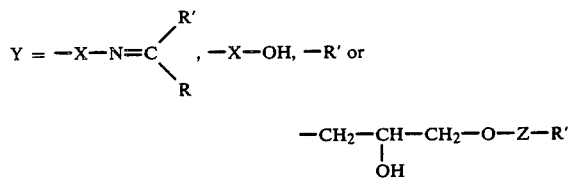

$Z = -CO, -X$
$n = 1-6$
$m = 1-12$

The ketones used for the reaction with the primary amino groups are generally aliphatic ketones, such as methyl ethyl ketone, diethyl ketone, methyl isobutyl ketone or ethyl n-propyl ketone, and cycloaliphatic ketones, such as cyclopentanone or cyclohexanone. The preferred aminoalkylamines and alkanolamines primarily are diethylenetriamine, N-methylethylenediamine, N-methylpropylenediamine, N-aminoethylpiperazine, 2-aminoethanol, 1-aminopropan-2-ol, 1-aminopropan-3-ol, 2-amino-2-methylpropan-1-ol, 3-amino-2,2-dimethylpropan-1-ol, 1,5-diaminopentan-3-ol or N-(2-aminoethyl)-N-(2-hydroxyethyl)-ethylenediamine.

The exothermic addition reaction of the aminoketimines described above onto the epoxide groups of the base resin of binder component A generally takes place at room temperature. To obtain complete conversion, the reaction is frequently finished off at temperatures between 50° and 125° C.

The addition of hydroxyketimines onto the epoxide groups of the base resin of binder component A usually takes place within the same temperature range, but it is advisable to use a basic catalyst, such as N,N-dimethylbenzylamine, or a Friedel-Crafts catalyst, such as tin-(II) chloride.

Reactive hydroxyl groups are very easily introduced by using secondary alkanolamines, such as methylethanolamine, diethanolamine, diisopropanolamine, butylethanolamine, cyclohexylethanolamine and the like.

It is also possible to use base resins having at least 2 isocyanate groups as base resin of binder component A. Resin-containing isocyanate groups are preferred to be polyisocyanates which have a relatively high degree of functionality and which are prepared by trimerization or oligomerization from diisocyanates or polyisocyanates and polyfunctional OH- or NH-containing compounds. Typical isocyanates are toluylene diisocyanate, hexamethylene diisocyanate, 4,4'-diphenylmethane diisocyanate, 4,4'-dicyclohexylmethane diisocyanate, 1,6-diisocyanato-2,2,4-trimethylhexane and 1-isocyanatomethyl-3-isocyanato-1,5,5-trimethylcyclohexane. It is, moreover, also possible to use with advantage isocyanate-containing prepolymers based on polyglycol ethers, polyesterpolyols, polyetherpolyols, polycaprolactonepolyols, polycaprolactampolyols or polyaminoamides.

Binder component B, which is the crosslinking agent, is a compound which contains at least 2 carbalkoxymethyl ester groups. The crosslinking agent can be a low molecular weight compound or an appropriately substituted resin. If the esterification is performed without an alcohol having an additional ester group, but with monoalcohols, such as methyl, ethyl or butyl alcohol, the transesterification reaction proceeds significantly more slowly. In this case, the crosslinking rate is too low, and the baked film is not sufficiently resistant to solvents. These disadvantages are avoided by using, in accordance with the invention, carbalkoxymethyl esters for the transesterification reaction. The compounds which form the crosslinking agent are preferably polyester resins, but it is also possible to use other compounds which contain free carboxyl groups and are accessible to esterification.

The transesterification component used is preferably polycarbalkoxymethyl esters of polycarboxylic acids. These include, besides others, bis-(carbalkoxymethyl)azelate, bis-(carbalkoxymethyl)sebacate, bis-(carbalkoxymethyl)adipate, bis-(carbalkoxymethyl)succinate and bis-(carbalkoxymethyl)terephthalate.

Polyfunctional crosslinking agents can advantageously be prepared as follows. First, equivalent amounts of a dicarboxylic anhydride (phthalic anhydride, hexahydrophthalic anhydride, trimellitic anhydride or succinic anhydride) are reacted with a polyol (glycerol, trimethylolpropane, pentaerythritol or dipentaerythritol) at temperatures below 145° C. The resulting acidic intermediate product is then converted into the end product. This can be accomplished, for example, by converting the acidic intermediate product into the ammonium salt and then reacting the ammonium salt with a monochloroacetate.

Component B is advantageously a polyacrylate resin of the following monomers:
(a) 10–50% by weight of alkyl acrylate having 1 to 18 carbon atoms in the alkyl radical and/or alkyl methacrylate having 2 to 18 carbon atoms in the alkyl radical,
(b) 0–60% by weight of methyl methacrylate,
(c) 0–35% by weight of styrene, α-methylstyrene, o- and/or p-chlorostyrene, p-tert.-butylstyrene, vinyltoluene and/or vinylcarbazole and
(d) 2–35% by weight of carbalkoxymethyl acrylate and/or methacrylate or of any other olefinically unsaturated, polymerizable compound which contains carbalkoxymethyl ester groups, the total amount of the constituents a, b, c and d being 100%.

The binder mixture of the invention can be in a finely divided, solid form or in the form of a solution in an organic solvent.

The electrocoating method requires that on protonation with acid the binder mixture is in the form of an aqueous solution or dispersion.

The solubility in water of the binder component and/or the crosslinking component is brought about by neutralizing with acids the primary, secondary and/or tertiary amino groups they contain. Suitable acids are in particular organic acids, but it is also possible to use, for example, hydrochloric acid or phosphoric acid. The amino groups are preferably neutralized with formic acid, acetic acid, malonic acid, lactic acid or citric acid.

Said acids can also be used if the solubilizing groups for the binder component and/or crosslinking component are introduced by adduct formation of an ammonium group or the salt of a sulfide/acid or phosphine/acid mixture with the binder or the crosslinking agent.

The degree of neutralization of the solubilizing groups is, based on these groups, between 0.2 and 1.0 equivalent and preferably between 0.25 and 0.6 equivalent of acid.

The neutralization can be carried out in the following ways. The acid is introduced into water, if appropriate together with dispersants, and the resin solution is stirred into the water at room temperature or, if appropriate, at elevated temperatures. However, the acid can also be added directly to the resin solution. The neutralized resin solution can then be stirred into the water, or, if appropriate, the water can be slowly incorporated into the resin solution.

The dispersion, to control its viscosity, the deposition voltage and the flow, can contain up to 20% of organic solvents. If, as a result of the method of preparation chosen, the batch contains too much solvent or even solvent which has an adverse effect on the properties, the solvents can be distilled out of the resin solution before the dispersing, or they are distilled out of the aqueous dispersion. It is advantageous for the sum total of all properties if the organic solvent content is as low as possible.

The solids content of a deposition bath which has been made up with the dispersion of the invention is 7–35 parts by weight, preferably 12–25 parts by weight. The pH of the deposition bath is between 4 and 8, preferably between 5 and 7.5. The anodes used in the deposition bath are non-corroding steel anodes or graphite anodes. The temperature of the made-up bath should be between 15° and 35° C., preferably between 20° and 30° C. The length of deposition and the deposition voltage are chosen to be such that the desired film thickness is obtained.

After the deposition process the coated article is rinsed off and is then ready for baking.

Irrespective of how the coating agents prepared from the binder mixture of the invention have been applied, the paint film is crosslinked in the course of baking at temperatures of 130° to 200° C. for 10–60 minutes, preferably 150° to 180° C. for 15–30 minutes.

The crosslinking reaction can further be accelerated by means of suitable catalysts. Suitable for this purpose are, in particular, ammonium compounds, such as benzyltrimethylammonium hydroxide, benzyltrimethylammonium chloride, trimethylcetylammonium bromide or tetraammonium iodide and organic tin compounds, such as dibutyltin dilaurate, and iron(III) acetylacetonate, zinc acetate, zinc 2-ethylhexoate, cobalt naphthenate, lead acetate, lead octoate or butyl titanate. Because the binder components are highly reactive, the amount of catalyst need only be small to accelerate the crosslinking reaction.

Pigmenting is effected in a well-known manner, namely by milling the pigments and the customary additives, such as fillers, corrosion inhibitors and antifoams (component C), in one of the two binder components. Examples of milling units which can be used are sand mills, ball mills and three-roll mills. The paint can be finished off by generally known methods.

The individual components A and B and, if appropriate, component C can be mixed in the form of their concentrated solutions and then jointly dispersed. However, it is also possible to disperse components A and B individually, the pigments having been ground in A or B, and to mix the dispersion of the individual components in the required ratio.

The invention also relates to a process for preparing coatings by applying a coating agent to a substrate in the form of a film and then hardening the film by baking, which coating agent contains a binder mixture which comprises the components (A) an organic nonacidic resin having a hydroxyl group content of at least 0.2 equivalent in 100 g of resin and having a molecular weight of at least 850, and (B) a crosslinking agent based on an organic compound which contains at least 2 carbalkoxymethyl ester groups per molecule.

Advantageous embodiments of the process according to the invention include applying finely divided, solid form coating agent by means of an electrostatic powder spray device and applying the coating agent in the form of a solution in an organic solvent by spraying, dipping, flow-coating, roll-coating and knife-coating-.

The invention also relates to the use of a binder mixture for preparing coatings, wherein the mixture comprises the components (A) an organic nonacidic resin having a hydroxyl group content of at least 0.2 equivalent in 100 g of resin and having a molecular weight of at least 850, and (B) a crosslinking agent based on an organic compound which contains at least 2 carbalkoxymethyl ester groups per molecule.

Advantageous embodiments of the use according to the invention are:

(1) a binder mixture for preparing coatings, wherein the mixture comprises the components (A) an organic nonacidic resin having a hydroxyl group content of at least 0.2 equivalent in 100 g of resin and having a molecular weight of at least 850, and (B) a cross-linking agent based on an organic compound which contains at least 2 carbalkoxymethyl ester group per molecule;

(2) wherein the mixture of (1), in addition to components (A) and (B) contains, as component (C), pigments, fillers, cross-linking catalysts, corrosion inhibitors and further paint assistants;

(3) wherein the proportion in (2) of component (A) is 50–95% by weight and that of component (B) is 5–50% by weight, the total amount of components (A) and (B) being 100%;

(4) wherein component (A) of (3) has a number average molecular weight of 1,000–20,000;

(5) wherein component (A) of (4), in addition to the hydroxyl groups, contains amino groups or ammonium groups;

(6) wherein component (B) of (5) has a number average molecular weight of 200–10,000;

(7) wherein component (B) of (6) is a polyacrylate resin of the following monomers:

(a) 10–50% by weight of alkyl acrylate having 1 to 18 carbon atoms in the alkyl radical and/or alkyl methacrylate having 2 to 18 carbon atoms in the alkyl radical, (b) 0–60% by weight of methyl methacrylate, (c) 0–35% by weight of styrene, α-methylstyrene, o- and/or p-chlorostyrene, p-tert.-butylstyrene, vinyltoluene and/or vinylcarbazole, and (d) 2–65% by weight of carbalkoxymethyl acrylate and/or methacrylate or of any other olefinically unsaturated, polymerizable compound which contains carbalkoxymethyl ester groups, the total amount of the constituents (a), (b), (c) and (d) being 100%;

(8) wherein the binder mixture of (7) is in a finely divided, solid form;

(9) wherein powder finishes are prepared from (8);

(10) wherein the binder mixture of (7) is in the form of a solution in an organic solvent;

(11) wherein baking finishes are prepared from (10);

(12) wherein the binder mixture of (7), after protonation with acid, is in the form of an aqueous solution or dispersion; and

(13) cathodic electrocoating by the mixture of (12).

The following examples illustrate the invention in more detail.

EXAMPLE 1

Preparation of a tetrafunctional crosslinking agent (crosslinking agent I)

109 g of pentaerythritol are mixed with 474 g of phthalic anhydride in a 4-necked flask which has been equipped with a reflux condenser, a stirrer, an internal thermometer and a gas inlet tube, and the mixture is heated to 140° C. under nitrogen. The reaction then proceeds exothermically and is kept at 160° C. by cooling. When an acid number of 305 has been reached, the batch is cooled down to room temperature and is admixed with 300 g of acetone. Thereafter 81 g of triethylamine are added, followed in dropwise fashion by 98 g of ethyl chloroacetate. The batch is then raised to the reflux temperature, is held at this temperature for 4 hours, and is then allowed to cool down. After 12 hours the triethylammonium chloride formed is filtered off. The filtrate is stripped of acetone in a rotary evaporator.

EXAMPLE 2

Preparation of a polyfunctional crosslinking agent (crosslinking agent II)

142 g of trimethylolpropane, 723 g of caprolactone and 600 g of methyl isobutyl ketone are introduced into a reaction vessel and heated up to the reflux temperature. 6 hours later, 609 g of trimellitic anhydride are added. When an acid number of 228 has been reached, the batch is cooled down to 50° C., and is admixed with a further 600 g of methyl isobutyl ketone, followed in slow dropwise fashion by 641 g of triethylamine. The temperature is held at 60° C. by cooling. 685 g of methyl chloroacetate are then added. The reaction is carried out at 60° C. for 4 hours. The batch is then cooled down to room temperature and the salt formed is filtered off. The solids content of the crosslinking resin is 70%.

EXAMPLE 3

Preparation of a polyfunctional crosslinking agent based on a polyacrylate resin (crosslinking agent III)

560 g of methyl isobutyl ketone (MIBK) are introduced under nitrogen into a 5 liter reactor and are heated to the reflux temperature. A monomer mixture of 1,400 g of methyl methacrylate, 560 g of carbethoxymethyl methacrylate, 840 g of ethylhexyl methacrylate and 14 g of dodecylmercaptan is added dropwise in the course of 4.5 hours. 140 g of tert.-butyl peroctoate in 200 g of MIBK are metered in at the same time. The polymerization reaction is then allowed to proceed until a constant viscosity of 4.0 dPa.s, 50% strength in MIBK, has been reached. The solids content is then adjusted to 70% by means of MIBK.

The number average molecular weight measured by gel permeation chromatography against a polystyrene standard is 2,100.

EXAMPLE 4

Preparation of a binder dispersion I

A 4-liter reaction vessel which has been equipped with a stirrer, a nitrogen inlet, a heating system, a thermometer and a reflux condenser is charged with 1,301 parts of a commercially available epoxy resin which is based on bisphenol A and has an epoxide equivalent weight of 188, 623 parts of perhydrobisphenol and 95 parts of xylene. 9 parts of dimethylbenzylamine are added as catalyst, and the batch is heated to 160° C. This temperature is maintained until an epoxide equivalent weight of 1,050 has been reached. The batch is then cooled down to 110° C., and 519 parts of the crosslinking agent described in Example 1 are added, followed by 182 parts of diethanolamine. The batch is then held at 110° C. for one hour.

A dispersing bath is prepared in the meantime from 2,634 parts of deionized water, 52 parts of glacial acetic acid and 53 parts of a commercially available emulsifier solution. The resin solution is dispersed in this bath. After 1½ hours a further 1,012 parts of deionized water are added and mixed in for 15 minutes.

The dispersion has a solids content of 37.5%.

EXAMPLE 5

Preparation of a binder dispersion II

A 4-liter reaction vessel which has been equipped with a stirrer, a nitrogen inlet tube, a heating system, a thermometer and a reflux condenser is charged with 1,132 parts of a commercially available epoxy resin which is based on bisphenol A and has an epoxide equivalent weight of 188, 564 parts of polypropylene glycol having a molecular weight of 750, 343 parts of bisphenol A, 133 parts of xylene and 3 parts of dimethylbenzylamine. The temperature is raised to 160° C. and maintained until an epoxide equivalent weight of 670 has been reached. The batch is then cooled down to 135° C., a further 6 parts of dimethylbenzylamine are added, and the temperature is maintained until an epoxide equivalent weight of 1,250 has been reached. The batch is then cooled down to 110° C., 615 parts of the crosslinking agent solution described in Example 2 and 158 parts of diethanolamine are added. The addition reaction is carried out for 1.5 hours, and 171 parts of phenylglycol are then added and mixed in for 15 minutes.

In the meantime a dispersing bath is prepared from 2,248 parts of deionized water, 52 parts of a commercially available emulsifier solution and 45 parts of glacial acetic acid. The resin solution is stirred into this dispersing bath. After one hour a further 1,532 parts of deionized water are added and mixed in. The solids content of the dispersion is 37.5%.

EXAMPLE 6

Preparation of a binder dispersion III

The batch is made up as in Example 5, except that 615 parts of the crosslinking agent solution of Example 3 are added. The dispersing bath is prepared as in Example 5, except that when deionized water is added for the second time 3,282 parts of deionized water are added, so that the dispersion has a solids content of 30%. This dispersion is then stripped from the low-boiling solvents by distillation in vacuo at 80° C. A total of 1,250 parts of aqueous and organic phase are distilled off. As a result the solids content of the dispersion rises to 35%.

EXAMPLE 7

Preparation of a gray pigment paste 800 parts of butylglycol are added to 953 parts of a commercially available epoxy resin which is based on bisphenol A and has an epoxide equivalent weight of 890. The mixture is heated to 80° C. 221 parts of a reaction product of 101 parts of diethanolamine and 120 parts of 80% strength aqueous lactic acid are added. The reaction is carried out at 80° C. until the acid number has dropped to below 1.

A vessel is charged with 1,800 parts of this product together with 2,447 parts of deionized water, and 2,460 parts of TiO$_2$, 590 parts of an extender based on aluminum silicate, 135 parts of lead silicate, 37 parts of carbon black and 25 parts of lead octoate are mixed in. This mixture is comminuted in a milling unit to a Hegman fineness of 5–7. 1,255 parts of deionized water are then added to produce the desired consistency of a paste. This gray paste has a very long shelflife.

EXAMPLE 8

Preparation of electrocoating baths and deposition 500 parts by weight of the binder dispersion are admixed with 196 parts of the pigment paste described in Example 6 and are adjusted, with deionized water, to a solids content in the bath of 20%. The paint films are deposited onto zinc-phosphatized metal sheet in the course of 2 minutes. The bath temperature is 27° C. The films are baked at 180° C. for 20 minutes.

|  | Dispersion I | Dispersion II | Dispersion III |
|---|---|---|---|
| Deposition voltage V | 270 | 290 | 350 |
| Film thickness μm | 25 | 21 | 17 |
| Cross-hatch | 0 | 0 | 0 |
| Adhesion | very good | very good | very good |
| Bending test | o.k. | o.k. | o.k. |
| Flow control | good | very good | good |

EXAMPLE 9

Preparation of a polyfunctional crosslinking agent based on an acrylate resin (croslinking agent IV)

First the following monomer is prepared. 580 g of acrylic acid are mixed with 500 g of acetone. 810 g of triethylamine are added dropwise to this mixture. As a result the temperature rises to 50° C. The mixture is is cooled down to room temperature, and 870 g of methyl chloroacetate are then added dropwise. Beforehand, 2 g of potassium iodide have been added as a catalyst to the ammonium salt solution. When the dropwise addition is complete, the batch is heated to the reflux temperature, and this temperature is maintained for 2 hours. The batch is then allowed to cool down and stand overnight, and the precipitate formed is filtered off.

480 g of the monomers described are mixed with 120 g of methyl methacrylate, 120 g of butyl acrylate and 300 g methyl isobutyl ketone. The monomer mixture is admixed with 19.2 g of t-butyl peroctoate and is heated to 80° C. The polymerization is carried out at this temperature in the course of 6 hours. The solvents are then removed in vacuo, and ethyglycol is used to adjust the solids content to 70%.

EXAMPLE 10

Preparation of a binder dispersion IV

A suitably equipped 5-liter reactor is charged with 1,058 g of a 75% strength epoxy resin solution (EEW=490), which are mixed with 214 g of a polyester diol of neopentylglycol and adipic acid (OH number 210) and heated up. 2.4 g of dimethylbenzylamine are added, and the temperature is held at 135° C. until an epoxide equivalent weight of 1,130 has been reached. The batch is then cooled down to 90° C. and a mixture of 47 g of methylethanolamine and 59 g of a 72% strength solution of diethylenetriamine bis-(methyl isobutyl)ketimine in methyl isobutyl ketone is added. An exothermic reaction sets in. The temperature is allowed to rise to 118° C. and is maintained for one hour. 90 g of phenylglycol and 540 g of crosslinking agent I are then added and mixed in for 15 minutes.

In the meantime a dispersing bath has been prepared from 1,728 g of deionized water, 23 g of glacial acetic acid and 40 g of an emulsifier mixture. The resin is dispersed therein. After an hour a further 950 g of deionised water are added and are mixed in for 15 minutes, and the dispersion is filtered.

Specification of dispersion I

| | |
|---|---|
| Solids content: | 36.3% (150° C., 30 minutes) |
| Density: | 1.043 |
| pH: | 6.9 |
| MEQ acid: | 0.27 |
| MEQ base: | 0.62 |

EXAMPLE 11

Preparation of a binder dispersion V

Example 10 is repeated, except that 772 g of crosslinking agent V are added as crosslinking agent. The dispersing bath is made up as follows: 1,498 g of deionized water, 23 g of glacial acetic acid and 40 g of emulsifier mixture. After the resin has been added, the further procedure is as described above.

Specification of dispersion V

| | |
|---|---|
| Solids content: | 36.7% (150° C., 30 minutes) |
| Density: | 1,049 |
| pH: | 7.1 |
| MEQ acid: | 0.26 |
| MEQ base: | 0.65 |

EXAMPLE 12

Preparation of a binder dispersion VI

A suitably equipped 5-liter reactor is charged with 1,378 g of a commercially available epoxy resin based on bisphenol A (EEW: 188) and 305 of neopentylglycol. The mixture is heated to 130° C., and 3 g of dimethylbenzylamine are added. Thereafter, when the exothermic reaction has died down, the temperature is held at 130° C. until an epoxide equivalent weight of 1,100 has been reached. The batch is cooled down to 90° C., and 123 g of diethanolamine and 108 g of a 72.5% strength solution of diethylenetriamine bis-(methyl isobutyl)ketimine in methyl isobutyl ketone are added. In the course of this addition the temperature rises again. The temperature is held at 115° C. for one hour, and 123 g of phenylglycol and 565 g of crosslinking agent I are then added and mixed in for 15 minutes.

In the meantime a dispersing bath has been prepared from 2,842 g of deionized water, 42 g of glacial acetic acid and 49 g of an emulsifier solution. The acid number of this bath is 13.8. The resin is dispersed therein. After one hour a further 1,555 g of deionized water are added and mixed in for 15 minutes, and the resulting dispersion is filtered.

Specification of dispersion VI

| | |
|---|---|
| Solids content: | 35.9% (150° C., 30 minutes) |
| Density: | 1,050 |
| pH: | 7.0 |
| MEQ acid: | 0.28 |
| MEQ base: | 0.67 |

EXAMPLE 13

Preparation of a binder dispersion VII

Example 12 is followed, except that 807 g of crosslinking agent IV are used as crosslinking agent. The dispersing bath is prepared from 2,600 g of deionized water, 42 g of glacial acetic acid and 49 g of an emulsifier solution. After the resin has been dispersed therein, the further procedure is as described in Example 12.

Specification of dispersion VII

| | |
|---|---|
| Solids content: | 36.3% |
| Density: | 1,044 |
| pH: | 6.9 |
| MEQ acid: | 0.30 |
| MEQ base: | |

EXAMPLE 14

Preparation of electrocoating baths and deposition 500 parts by weight of binder dispersions IV to VII are admixed with 196 parts of the pigment paste described in Example 7 and are adjusted to a solids content of 20% by means of deionized water. The paint films are deposited onto zinc-phosphatized sheet in the course of 2 minutes. The bath temperature is 27° C. The films are baked at 180° C. for 20 minutes.

| | Dispersion IV | Dispersion V | Dispersion VI | Dispersion VII |
|---|---|---|---|---|
| Deposition voltage V | 290 | 315 | 300 | 320 |
| Film thickness μm | 22 | 18 | 21 | 17 |
| Cross-hatch Adhesion | 0 very good | 0 very good | 0 very good | 0 very good |
| Flow control | good | very good | good | very good |

What we claim is:

1. A heat-hardenable binder mixture of organic resins, which consists essentially of the following components:
   (A) an organic nonacidic resin having a hydroxyl group content of at least 0.2 equivalent in 100 g of resin and having a molecular weight of at least 850; and
   (B) a cross-linking agent comprising an organic compound which contains at least two carbalkoxymethyl ester groups per molecule, wherein the proportion of component (A) is 50-95% by weight and that of component (B) is 5-50% by weight, the total weight of components (A) and (B) being 100%.

2. The binder mixture of claim 1, further comprising, as component (C), pigments, fillers, cross-linking catalysts, corrosion inhibitors, and further paint assistants.

3. The binder mixture of claim 2, wherein component (A) has a number average molecular weight of 1,000-20,000.

4. The binder mixture of claim 3, wherein component (A), in addition to the hydroxyl groups, contains amino groups or ammonium groups.

5. The binder mixture of claim 4, wherein component (B) has a number average molecular weight of 200-10,000.

6. The binder mixture of claim 5, wherein component (B) is a polyacrylate resin having the following monomers:
   (a) 10-50% by weight of alkyl acrylate having 1 to 18 carbon atoms in the alkyl radical, alkyl methacrylate having 2 to 18 carbon atoms in the alkyl radical or a mixture of alkylacrylate and alkylmethacrylate;
   (b) 0-60% by weight of methyl methacrylate;

(c) 0–35% by weight of styrene, α-methylstyrene, o-chlorostyrene, p-chlorostyrene, p-tert.-butylstyrene, vinyltoluene, vinylcarbazole or mixtures thereof; and (d) 2–65% by weight of carbalkoxymethyl acrylate, carbalkoxymethyl methacrylate, an olefinically unsaturated, polymerizable compound which contains carbalkoxymethyl ester groups or mixtures thereof, the total weight of the constitutents (a), (b), (c) and (d) being 100%.

7. The binder mixture of claim 6, in a finely divided, solid form.

8. The binder mixture of claim 6, in the form of a solution in an organic solvent.

9. The binder mixture of claim 6, in the form of an aqueous solution or dispersion after protonation with acid.

10. In a process for preparing coatings by applying a coating agent to a substrate in the form of a film and then hardening the film by baking, the improvement comprising:

said coating agent containing a binder mixture which consists essentially of a mixture of the following components:

(A) an organic nonacidic resin having a hydroxyl group content of at least 0.2 equivalent in 100 g of resin and having a molecular weight of at least 850; and (B) a cross-linking agent comprising an organic compound which contains at least two carbalkoxymethyl ester groups per molecule, wherein the proportion of component (A) is 50–95% by weight and that of component (B) is 5–50% by weight, the total weight of components (A) and (B) being 100%.

11. The process of claim 10, further comprising as component (C), pigments, fillers, cross-linking catalysts, corrosion inhibitors and further paint assistants.

12. The process of claim 11, wherein component (A) has a number average molecular weight of 1,000–20,000.

13. The process of claim 12, wherein component (A), in addition to the hydroxyl groups, contains amino groups or ammonium groups.

14. The process of claim 13, wherein component (B) has a number average molecular weight of 200–10,000.

15. The process of claim 14, wherein component (B) is a polyacrylate resin having the following monomers:

(a) 10–50% by weight of alkyl acrylate having 1 to 18 carbon atoms in the alkyl radical, alkyl methacrylate having 2 to 18 carbon atoms in the alkyl radical or a mixture of alkylacrylate and alkylmethacrylate;

(b) 0–60% by weight of methyl methacrylate;

(c) 0–35% by weight of styrene, α-methylstyrene, o-chlorostyrene, p-chlorostyrene, p-tert.-butylstyrene, vinyltoluene, vinylcarbazole or mixtures thereof; and (d) 2–65% by weight of carbalkoxymethyl acrylate, carbalkoxymethyl methacrylate, an olefinically unsaturated, polymerizable compound which contains carbalkoxymethyl ester groups or mixtures thereof, the total weight of the constituents (a), (b), (c) and (d) being 100%.

16. The process of claim 15, wherein said coating agent is in a finely divided, solid form.

17. The process of claim 16, wherein said coating agent is applied by means of an electrostatic powder spray device.

18. The process of claim 13, wherein said binder mixture is in the form of a solution in an organic solvent.

19. The process of claim 18, wherein said coating agent is applied by spraying, dipping, flow-coating, roll-coating or knife-coating.

20. The process of claim 15, wherein an electrically conductive substrate is dipped into an aqueous bath which has been prepared from said coating agent after at least partial neutralization by acid and is connected as the cathode, a film is deposited onto said substrate by means of direct current, said substrate is removed from the bath, and said film is hardened by baking.

21. In an article having a coating from a binder mixture deposited thereon, the improvement comprising:

said binder mixture consisting essentially of the following components:

(A) an organic nonacidic resin having a hydroxyl group content of at least 0.2 equivalent in 100 g of resin and having a molecular weight of at least 850; and (B) a cross-linking agent comprising an organic compound which contains at least two carbalkoxymethyl ester groups per molecule, wherein the proportion of component (A) is 50–95% by weight and that of component (B) is 5–50% by weight, the total weight of components (A) and (B) being 100%.

22. The article of claim 21, further comprising as component (C), pigments, fillers, cross-linking catalysts, corrosion inhibitors and further paint assistants.

23. The article of claim 22, wherein component (A) has a number average molecular weight of 1,000–20,000.

24. The article of claim 23, wherein component (A), in addition to the hydroxyl groups, contains amino groups or ammonium groups.

25. The article of claim 24, wherein component (B) has a number average molecular weight of 200–10,000.

26. The article of claim 25, wherein component (B) is a polyacrylate resin having the following monomers:

(a) 10–50% by weight of alkyl acrylate having 1 to 18 carbon atoms in the alkyl radical, alkyl methacrylate having 2 to 18 carbon atoms in the alkyl radical or a mixture of alkyl acrylate and alkyl methacrylate;

(b) 0–60% by weight of methyl methacrylate;

(c) 0–35% by weight of styrene, α-methylstyrene, o-chlorostyrene, p-chlorostyrene, p-tert.-butylstyrene, vinyltoluene, vinylcarbazole or mixtures thereof; and (d) 2–65% by weight of carbalkoxymethyl acrylate, carbalkoxymethyl methacrylate, an olefinically unsaturated, polymerizable compound which contains carbalkoxymethyl ester groups or mixtures thereof, the total weight of the constituents (a), (b), (c) and (d) being 100%.

27. The article of claim 26, wherein said binder mixture is in a finely divided, solid form.

28. The article of claim 27, wherein said coating is a powder finish.

29. The article of claim 26, wherein said binder mixture is in the form of a solution in an organic solvent.

30. The article of claim 29, wherein said coating is baked.

31. The article of claim 26, wherein said binder mixture is protonated with acid to form an aqueous solution or dispersion.

32. The article of claim 31, wherein said coating is applied by cathodic electrocoating.

33. The binder of claim 1, wherein component B has the general formula:

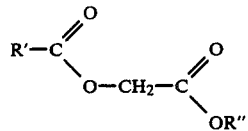

34. The process of claim 10, wherein component B has the general formula

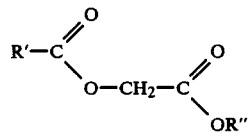

35. The article of claim 21, wherein component B has the general formula:

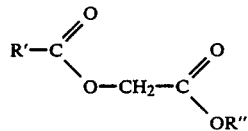

* * * * *